(12) United States Patent
Chin et al.

(10) Patent No.: US 8,971,292 B2
(45) Date of Patent: Mar. 3, 2015

(54) METHOD AND APPARATUS FOR POWER CONTROL DURING TD-SCDMA BATON HANDOVER

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 13/379,606

(22) PCT Filed: May 11, 2010

(86) PCT No.: PCT/US2010/034455
§ 371 (c)(1),
(2), (4) Date: Dec. 20, 2011

(87) PCT Pub. No.: WO2011/040995
PCT Pub. Date: Apr. 7, 2011

(65) Prior Publication Data
US 2012/0182968 A1 Jul. 19, 2012

Related U.S. Application Data

(60) Provisional application No. 61/247,207, filed on Sep. 30, 2009.

(51) Int. Cl.
*H04W 52/14* (2009.01)
*H04W 36/00* (2009.01)
*H04W 52/40* (2009.01)
*H04W 52/08* (2009.01)
*H04W 52/24* (2009.01)
*H04W 52/32* (2009.01)

(52) U.S. Cl.
CPC ............ *H04W 52/40* (2013.01); *H04W 52/08* (2013.01); *H04W 52/143* (2013.01); *H04W 52/146* (2013.01); *H04W 52/241* (2013.01); *H04W 52/325* (2013.01)
USPC ............................ 370/331; 370/335; 455/436

(58) Field of Classification Search
CPC . H04W 36/0033; H04W 36/00; H04W 40/36; H04W 16/08; H04W 52/04; H04W 52/58; H04W 52/18; H04W 52/06
USPC ......................................... 370/331, 252, 280
See application file for complete search history.

(56) References Cited

U.S. PATENT DOCUMENTS

2005/0272426 A1* 12/2005 Yang et al. ................... 455/436
(Continued)

FOREIGN PATENT DOCUMENTS

| CN | 1688113 A | 10/2005 |
|---|---|---|
| CN | 101185257 A | 5/2008 |
| WO | 2006107553 A2 | 10/2006 |

OTHER PUBLICATIONS

Bo Li, et al., "Recent advances on TD-SCDMA in China," IEEE Communications Magazine, IEEE Service Center, 2005, vol. 43, pp. 30-37.
(Continued)

*Primary Examiner* — Andrew Chriss
*Assistant Examiner* — Romani Ohri
(74) *Attorney, Agent, or Firm* — Kristine U. Ekwueme (57) ABSTRACT

A method for wireless communication comprises switching an uplink (UL) from a source cell to a target cell; and receiving an uplink transmit power control (TPC-UL) command from the source cell, wherein the TPC-UL command is generated by the target cell.

45 Claims, 6 Drawing Sheets

(56) References Cited

U.S. PATENT DOCUMENTS

| | | | |
|---|---|---|---|
| 2007/0047501 A1* | 3/2007 | Usuda et al. | 370/335 |
| 2007/0211684 A1* | 9/2007 | Lee et al. | 370/342 |
| 2008/0200202 A1* | 8/2008 | Montojo et al. | 455/522 |
| 2009/0219871 A1* | 9/2009 | Davis et al. | 370/329 |

OTHER PUBLICATIONS

International Search Report and Written Opinion—PCT/US2010/034455—ISA/EPA—Aug. 31, 2010.

Taiwan Search Report—TW099115318—TIPO—Dec. 8, 2013.

* cited by examiner

METHOD AND APPARATUS FOR POWER CONTROL DURING TD-SCDMA BATON HANDOVER

CROSS-REFERENCE TO RELATED APPLICATION(S)

This application claims the benefit of U.S. Provisional Patent Application No. 61/247,207, entitled "APPARATUS AND METHOD FOR CLOSED-LOOP POWER CONTROL FOR TD-SCDMA BATON HANDOVER", filed on Sep. 30, 2009, which is expressly incorporated by reference herein in its entirety.

BACKGROUND

1. Field

Aspects of the present disclosure relate generally to wireless communication systems, and more particularly, to power control for Time Division Synchronous Code Division Multiple Access (TD-SCDMA) baton handover.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method of wireless communication, comprising switching an uplink (UL) from a source cell to a target cell; and receiving an uplink transmit power control (TPC-UL) command from the source cell, wherein the TPC-UL command is generated by the target cell.

In an aspect of the disclosure, an apparatus for wireless communication, comprising means for switching an uplink (UL) from a source cell to a target cell; and means for receiving an uplink transmit power control (TPC-UL) command from the source cell, wherein the TPC-UL command is generated by the target cell.

In an aspect of the disclosure, a computer program product, comprising a computer-readable medium comprising code for: switching an uplink (UL) from a source cell to a target cell; and receiving an uplink transmit power control (TPC-UL) command from the source cell, wherein the TPC-UL command is generated by the target cell.

In an aspect of the disclosure, an apparatus for wireless communication, comprising at least one processor; and a memory coupled to the at least one processor, wherein the at least one processor is configured to: switch an uplink (UL) from a source cell to a target cell; and receive an uplink transmit power control (TPC-UL) command from the source cell, wherein the TPC-UL command is generated by the target cell.

Advantages of the present disclosure may include having the capability for closed-loop power control for both downlink and uplink paths during baton handover and improved power management of the wireless links during baton handover.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
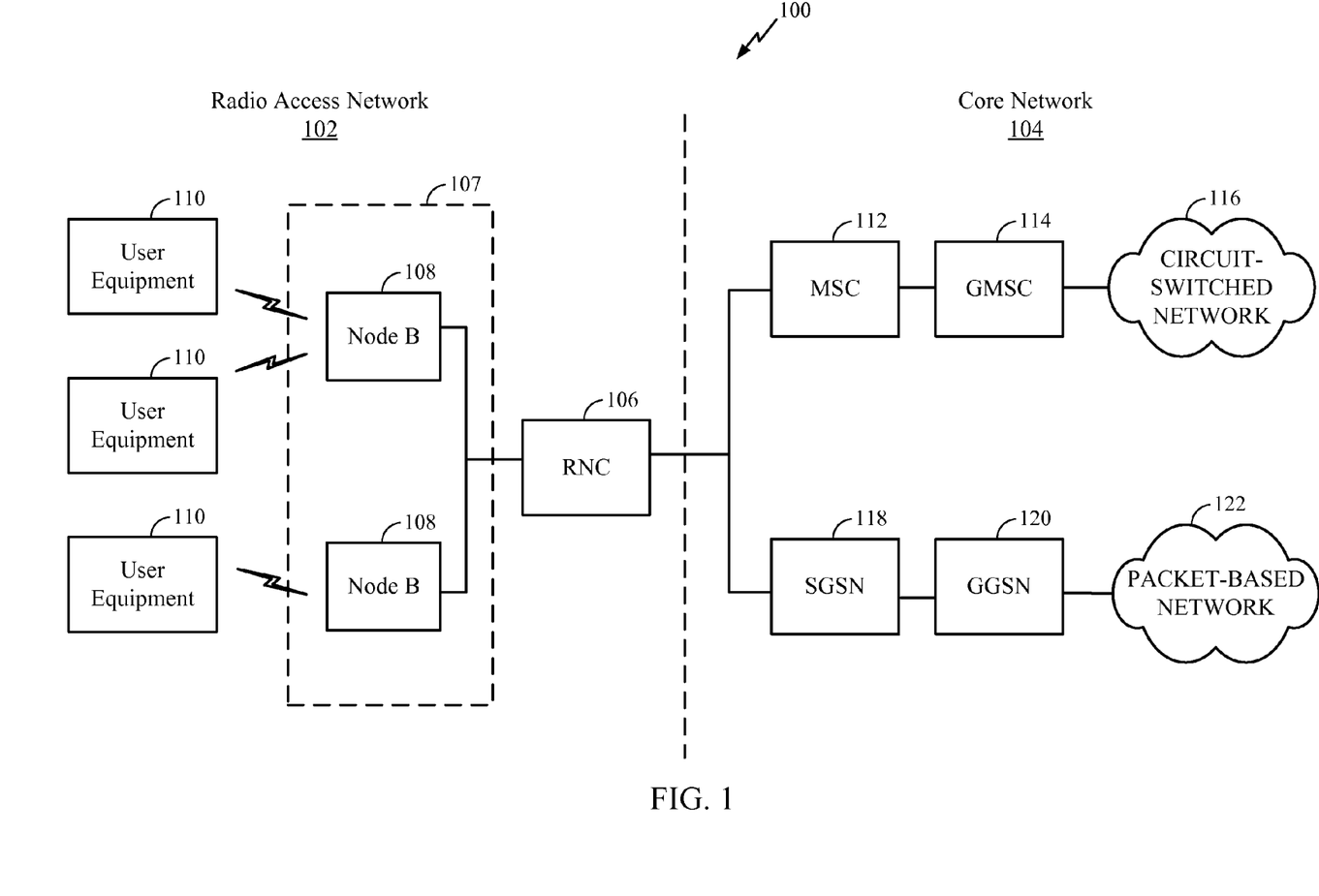
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
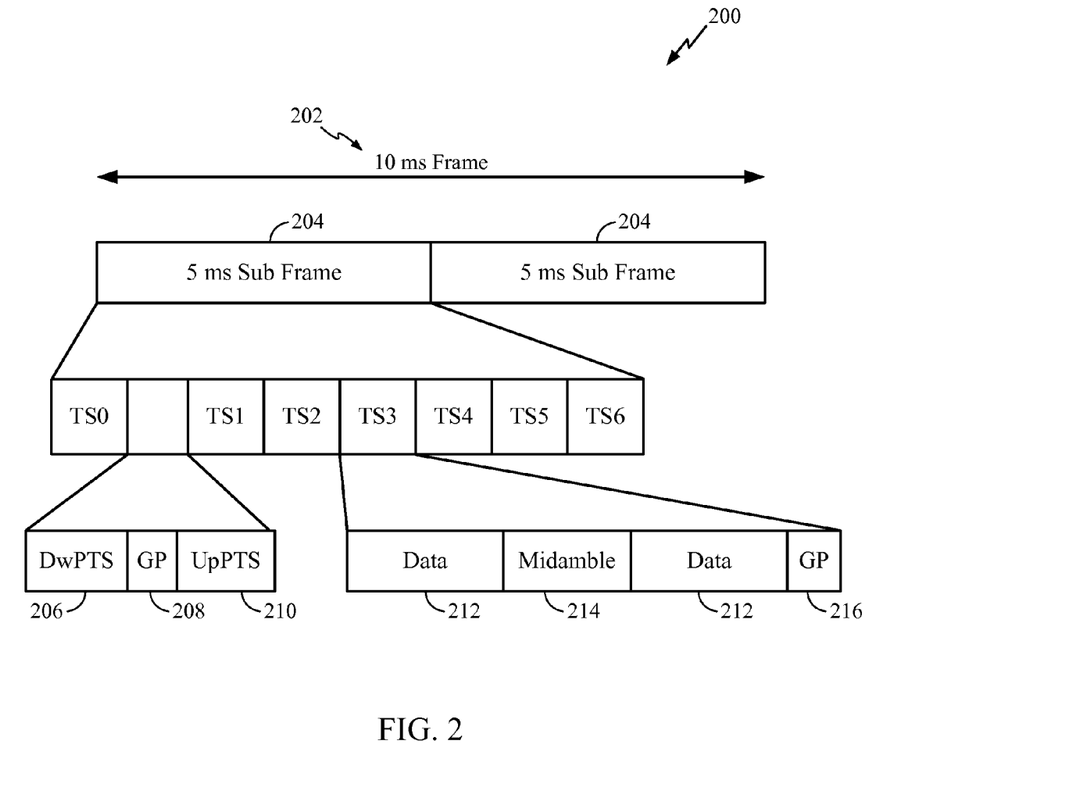
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
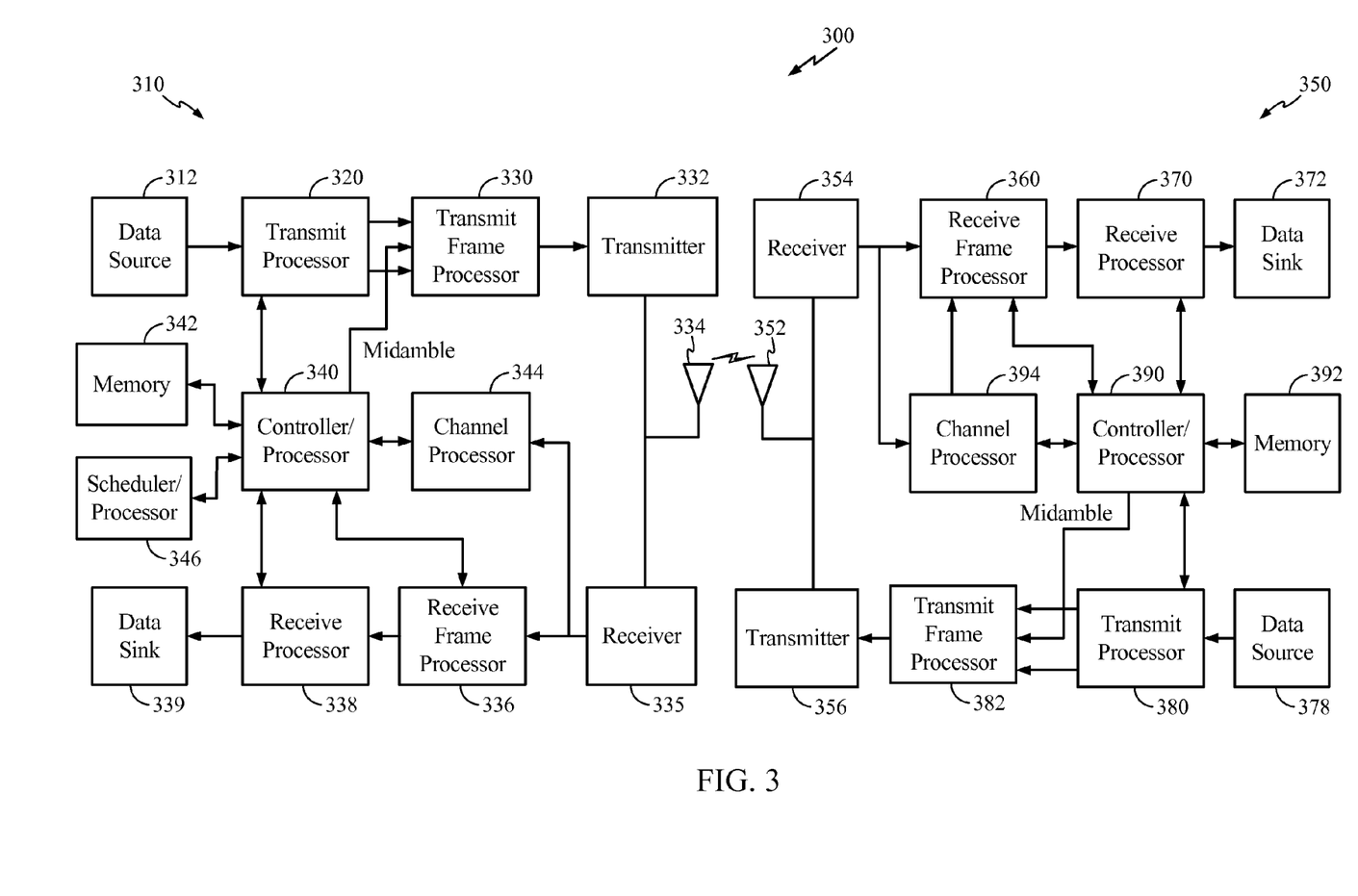
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

An important protocol for wireless communication systems relates to cell handover, which is the transfer of wireless connections from one cell, known as the source cell, to another cell, known as the target cell. Several types of handover may be employed, for example, hard handover, soft handover, and baton handover. A hard handover is also known as a "break-before-make" handover, which means that the first connection between the mobile station and the source cell is broken before the second connection between the mobile station and the target cell is made. A soft handover is also known as a "make-before-break" handover, where the first connection is maintained and not broken until the second connection is made. A baton handover is an intermediate case where initial synchronization is performed prior to handover to minimize the transition time.

TD-SCDMA is one of three options for third generation (3G) cellular networks. TD-SCDMA uses both time division and code division to allow multiple mobile stations, also known as user equipment (UE), to share the same allocated radio bandwidth. The downlink and uplink transmissions also share the same bandwidth with different time slots using time division duplexing (TDD). In this context, duplexing refers to the two directions of communications between the base station and the UE, downlink and uplink.

In TD-SCDMA systems, the downlink and uplink Dedicated Physical Channels (DPCHs) are subject to power control. The downlink DPCH is directed by the UE which transmits the Transmit Power Control (TPC) command message in some of the bits of the uplink data. The uplink DPCH is directed by the Node B which transmits the Transmit Power Control (TPC) command message in some of the bits of the downlink data. In one aspect, the location of the TPC field (not shown) is between the data and the midamble (shown in FIG. 2) within the time slot.

One salient feature of the TD-SCDMA protocols is the baton handover. During the baton handover, the UE can achieve the initial uplink power control using an open-loop measurement. For example, the UE can measure the received power of the P-CCPCH (Primary Common Control Physical Channel) of the target Node B. If the P-CCPCH is observed with more power loss, then the UE can increase the uplink transmit power further.

The UTRAN sends the PHYSICAL CHANNEL RECONFIGURATION message to the UE through the source Node B to initiate the baton handover process. The UE first switches the uplink path to the target Node B. Then the UE switches the downlink path to the target Node B. Normally, the UE can only receive from one Node B at one time (i.e. in a single receive configuration). During the baton handover, the UE can have a downlink with the source cell or source Node B and an uplink with the target cell or target Node B. Therefore, it is not possible to maintain the closed-loop power control until the end of baton handover. The only possible power control method during baton handover is an open-loop power control technique. However, the baton handover can last for a few hundred milliseconds. The open loop based power control technique may not be very efficient. As a result, the wireless transmissions may use more or less power than needed.

Disclosed herein is a closed-loop power control procedure in the TD-SCDMA baton handover. Two cases of baton handover are considered: case A where the source cell and target cell are in the same Node B, and case B where the source cell and target cell are in different Node Bs but are controlled by the same RNC (Radio Network Controller).

A Node B is an example of a base station which communicates directly with the UEs for third generation (3G) wireless systems. In one aspect, a Node B provides radio access for one cell or for several cells, depending on the system configuration. For example, a source cell and target cell could be managed by the same Node B or could be managed by two different Node Bs.

In case A where the source cell and target cell are within the same Node B, during Uplink DPCH, the target cell continues to measure the uplink signal, and the target cell calculates the SIR (signal to interference ratio) to determine the contents of the TPC command message on the uplink DPCH on the target cell. The target cell forwards the TPC command message to the source cell whenever a new TPC command message is available. Since both cells are in the same Node B, the TPC command message can be easily transported. The source cell transmits the received TPC command message to the UE which can then adjust its transmit power level. The procedure is halted when the UE switches the downlink from the source cell to the target cell. At that point, the power control can be supported only by the target cell.

During Downlink DPCH, the UE continues to measure the downlink signal on the source cell, and the UE calculates the SIR (signal to interference ratio) to determine the contents of the TPC command message on the downlink DPCH on the source cell. The UE transmits the TPC command message to the target cell via the uplink DPCH. The target cell forwards the TPC command message to the source cell whenever a new TPC command message is available. Since both cells are in the same Node B, the TPC command message can be easily transported. The source cell uses the received TPC command message to control its transmit power to this UE. The procedure is halted when the UE switches the downlink. At that point, the power control can be supported only by the target cell.

Figure 4:
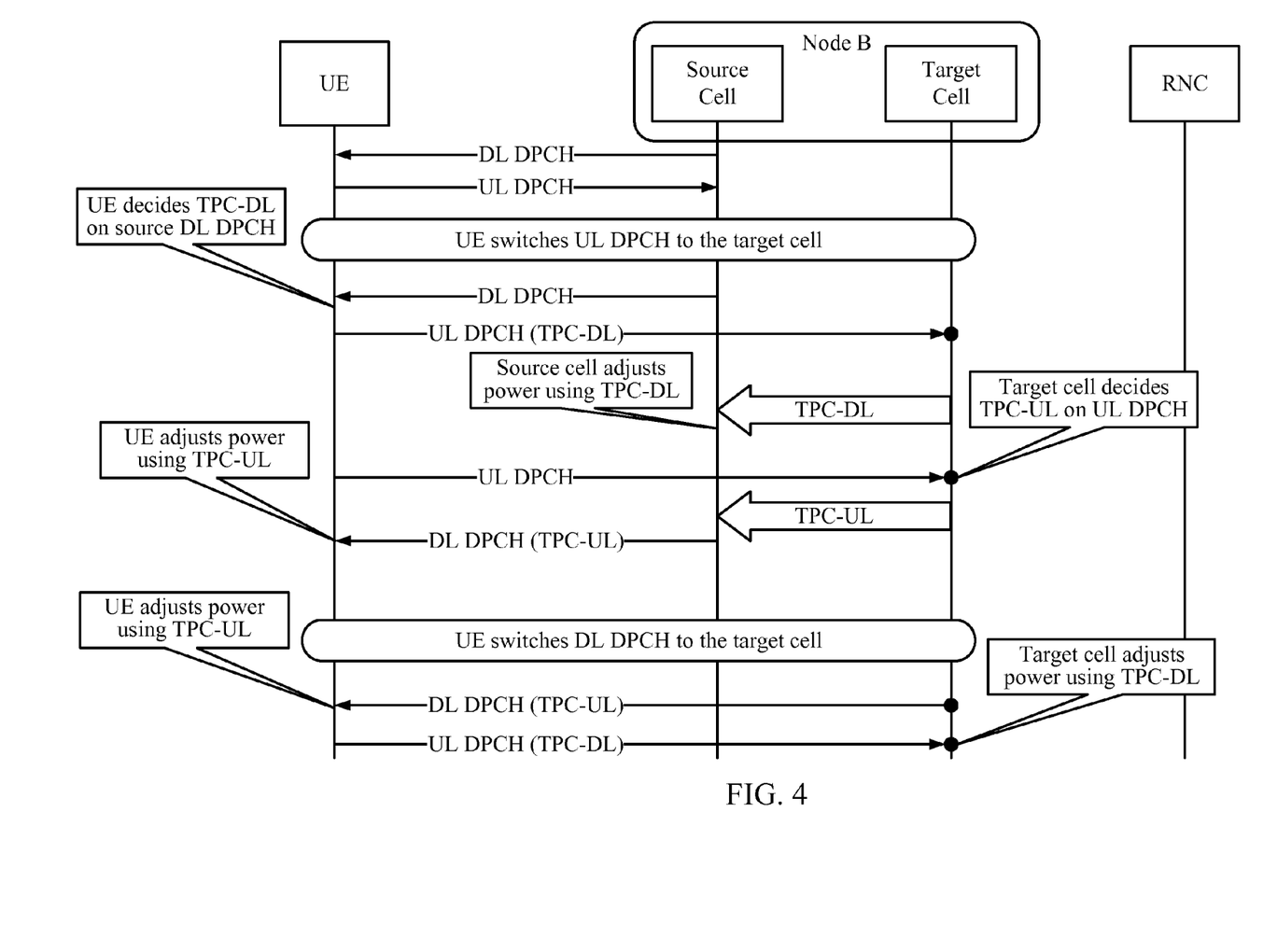
FIG. 4 is a flow diagram conceptually illustrating an example of a closed-loop power control procedure in the TD-SCDMA baton handover when both source cell and target cell are within the same Node B.

FIG. 4 is a flow diagram conceptually illustrating an example of a closed-loop power control procedure in the TD-SCDMA baton handover when both source cell and target cell are within the same Node B. In FIG. 4, Downlink DPCH is sent from the source cell to the UE which then returns the Uplink DPCH to the source cell. The UE then switches the Uplink DPCH to the target cell. In one aspect, the Uplink DPCH transmits the Transmit Power Control command in some of the bits of the uplink data (TPC-DL). Then, the TPC-DL is sent from the target cell to the source cell. Similarly, the target cell sends the Transmit Power Control command (TPC-UL) to the source cell. From the source cell, the TPC-UL is transmitted on the Downlink DPCH to the UE. The UE then switches the Downlink DPCH to the target cell. Thus TPC-UL is transmitted on the Downlink DPCH from the target cell to the UE. And, TPC-DL is transmitted on the Uplink DPCH from the UE to the target cell.

In case B where the source cell and target cell are in different Node Bs but are controlled by the same RNC (Radio Network Controller), in the Uplink DPCH, the target Node B continues to measure the uplink signal, and the target cell calculates the SIR (signal to interference ratio) to determine the contents of the TPC command message on the uplink DPCH on the target Node B. The target Node B forwards the TPC command message using the Power Control Indication message to the RNC whenever a new TPC command message is available. This forwarding is required because the source Node B and the target Node B are in different physical nodes (i.e., different Node Bs). Therefore, the TPC information has to be transmitted through the Iub interface using a new Power Control Indication message. The RNC sends the TPC command message to the source Node B using a new Iub Power Control Indication message. The source Node B transmits the received TPC command message to the UE which adjusts its transmit power as needed. The procedure is halted when the UE switches the downlink. At this point, the power control can be supported only by the target Node B.

In the Downlink DPCH, the UE continues to measure the DL signal on the source Node B, and the UE calculates the SIR (signal to interference ratio) to determine the contents of the TPC command message on the downlink DPCH on the source Node B. The UE transmits the TPC command message to the target Node B via the uplink DPCH. The target Node B forwards the TPC command message using the Power Control Indication message to the RNC whenever a new TPC command message is available. This forwarding is required because the source Node B and the target Node B are in different physical nodes (i.e., different Node Bs). Therefore, the TPC information has to be transmitted through the Iub interface using a new Power Control Indication message. The RNC sends the TPC command message to the source Node B using a new Iub Power Control Indication message. The source Node B uses the received TPC command message to control the transmit power to this UE. The procedure is halted when the UE switches the downlink. At this point, the power control can be supported only by the target Node B.

Figure 5:
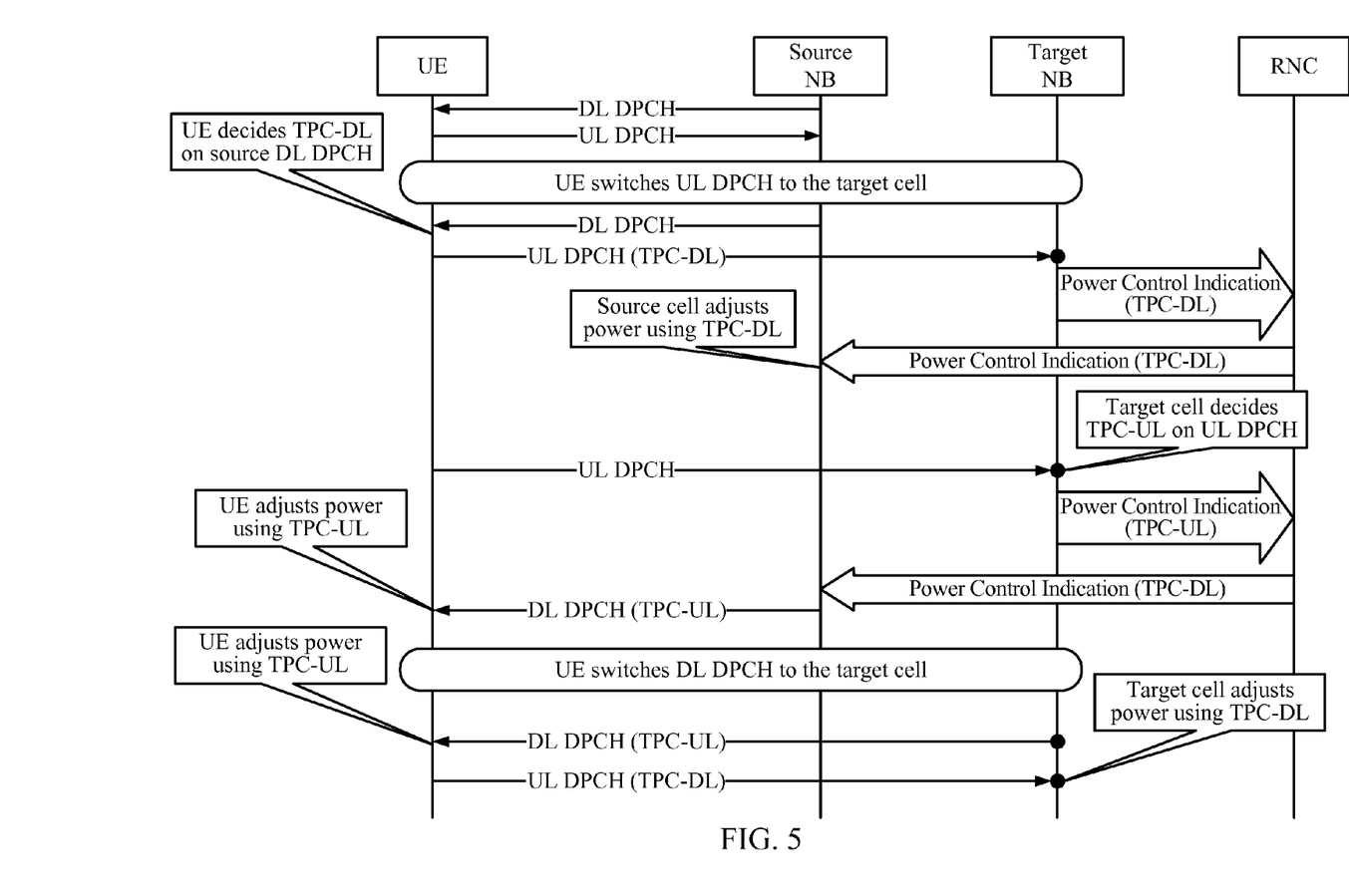
FIG. 5 is a flow diagram conceptually illustrating an example of a closed-loop power control procedure in the TD-SCDMA baton handover when the source cell and target cell are in different Node Bs.

FIG. 5 is a flow diagram conceptually illustrating an example of a closed-loop power control procedure in the TD-SCDMA baton handover when the source cell and target cell are in different Node Bs. In FIG. 5, Downlink DPCH is sent from the source Node B to the UE which then returns the Uplink DPCH to the source Node B. The UE then switches the Uplink DPCH to the target cell. In one aspect, the Uplink DPCH transmits the Transmit Power Control command in some of the bits of the uplink data (TPC-DL). Power Control Indication for Downlink (TPC-DL) is sent by the target Node B to the RNC which is then forwarded by the RNC back to the source Node B. A Uplink DPCH is sent by the UE to the target Node B. Power Control Indication for Uplink (TPC-UL) is sent by the target Node B to the RNC which is then forwarded by the RNC back to the source Node B. A Downlink DPCH (with TPC-UL) is sent by the source Node B to the UE. The UE then switches the Downlink DPCH to the target cell. A Downlink DPCH (with TPC-UL) is sent by the target Node B to the UE. And, an Uplink DPCH (with TPC-DL) is sent by the UE to the target Node B.

Figure 6:
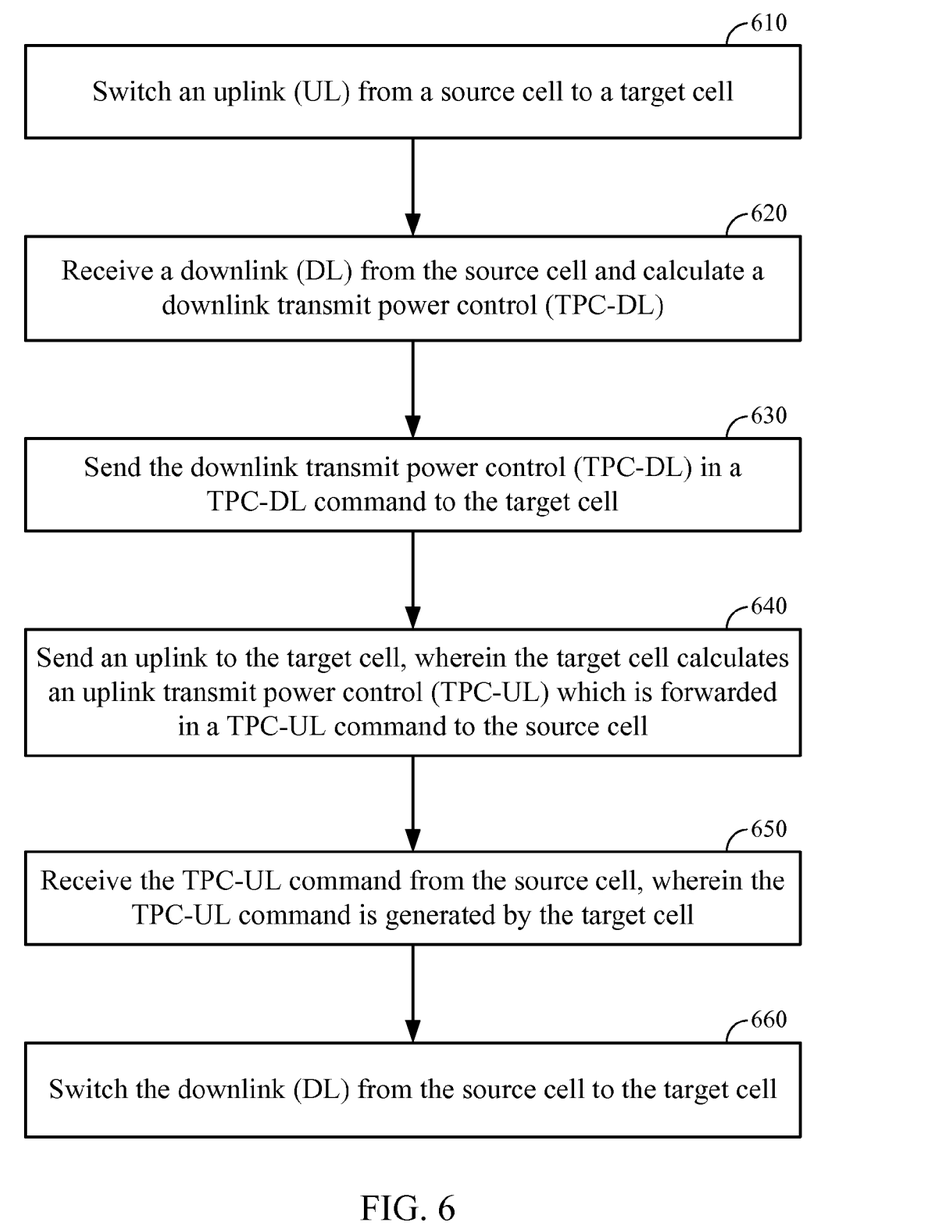
FIG. 6 is a functional block diagram conceptually illustrating example blocks executed to implement the functional characteristics of one aspect of the present disclosure.

FIG. 6 is a functional block diagram illustrating example blocks executed in conducting wireless communication according to one aspect of the present disclosure. In block 610, switch an uplink (UL) from a source cell to a target cell. Additionally, in block 620, receive a downlink (DL) from the source cell and calculate a downlink transmit power control (TPC-DL). In one example, the downlink transmit power control (TPC-DL) is based on signal-to-interference ratio (SIR) measured from the downlink (DL).

Furthermore in block 630, send the downlink transmit power control (TPC-DL) in a TPC-DL command to the target cell. In one example, the TPC-DL command is sent on the uplink. In one example, target cell and the source cell are associated with the same Node B and the TPC-DL command is forwarded by the target cell to the source cell. In another example, the target cell is associated with a first Node B and the source cell is associated with a second Node B such that the first Node B and the second Node B are different. In this example, the TPC-DL command is forwarded to a Radio Network Controller (RNC) using a first Power Control Indication message. The RNC then forwards the TPC-DL command through an Iub interface using a second Power Control Indication message to the source cell. In one example, the TPC-DL command is used to control downlink transmit power of the source cell.

Furthermore in block 640, send an uplink to the target cell, wherein the target cell calculates an uplink transmit power control (TPC-UL) which is forwarded in a TPC-UL command to the source cell. In one example, the uplink includes the TPC-DL command in block 630. In one example, the uplink transmit power control (TPC-UL) calculated by the target cell is based on signal-to-interference ratio (SIR) measured from the uplink (UL). In one example, the target cell and the source cell are associated with the same Node B and the TPC-UL command is forwarded by the target cell to the source cell. In another example, the target cell is associated with a first Node B and the source cell is associated with a second Node B such that the first Node B and the second Node B are different. In this example, the TPC-UL command is forwarded to the Radio Network Controller (RNC) using a third Power Control Indication message. The RNC then forwards the TPC-UL command through a Iub interface using a fourth Power Control Indication message to the source cell. One skilled in the art would understand that the first, second, third and fourth Power Control Indication messages are indicated as first, second, third or fourth to show that they are four different Power Control Indication messages.

Furthermore in block 650, receive the TPC-UL command from the source cell, wherein the TPC-UL command is generated by the target cell. In one example, the TPC-UL command is used to control uplink transmit power of a user equipment, for example, a user equipment receiving the TPC-UL command. In one example, the TPC-UL command is sent on the downlink. Furthermore in block 660, switch the downlink (DL) from the source cell to the target cell.

In one aspect, the example power control procedures illustrated in FIGS. 4, 5 and 6 are executed by the controller/processor 390 of the UE 350 illustrated in FIG. 3. In one example, the execution of the power control procedures may be implemented by the controller/processor 390 in conjunction with one or more of the other components illustrated in FIG. 3.

In one configuration, the UE 350, as illustrated in FIG. 3, for wireless communication includes means for switching an uplink (UL) from a source cell to a target cell; means for receiving a downlink (DL) from the source cell and calculating a downlink transmit power control (TPC-DL); means for sending the downlink transmit power control (TPC-DL) in a TPC-DL command to the target cell; means for sending an uplink to the target cell, wherein the target cell calculates an uplink transmit power control (TPC-UL) which is forwarded in a TPC-UL command to the source cell; means for receiving the TPC-UL command from the source cell; and means for switching the downlink (DL) from the source cell to the target cell.

In one aspect, the aforementioned means may be the controller/processor 390 of the UE 350 illustrated in FIG. 3 configured to perform the functions recited by the aforementioned means. In another aspect, the aforementioned means may be a module or any apparatus configured to perform the functions recited by the aforementioned means and may include one or more components illustrated in FIG. 3. In one example, the execution of the handover procedures may be implemented by the controller/processor 390 in conjunction with one or more of the other components illustrated in FIG. 3.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   switching an uplink (UL) from a source cell to a target cell while maintaining a downlink (DL) with the source cell during a baton handover;
   transmitting a downlink transmit power control (TPC-DL) command to the target cell via the UL, the TPC-DL command subsequently being received at the source cell via a transmission from the target cell; and
   receiving an uplink transmit power control (TPC-UL) command from the source cell during the baton handover, wherein the TPC-UL command is generated by the target cell.

2. The method of claim 1 wherein the TPC-UL command is used to control uplink transmit power of a user equipment.

3. The method of claim 1 further comprising receiving the downlink (DL) from the source cell and calculating the TPC-DL.

4. The method of claim 3 wherein the TPC-DL is based on signal-to-interference ratio (SIR) measured from the downlink (DL).

5. The method of claim 1 wherein the target cell is associated with a first Node B and the source cell is associated with a second Node B such that the first Node B and the second Node B are different.

6. The method of claim 5 wherein the TPC-DL command is forwarded to a Radio Network Controller (RNC) using a first Power Control Indication message.

7. The method of claim 6 wherein the TPC-DL command is further forwarded from the Radio Network Controller (RNC) through an Iub interface using a second Power Control Indication message to the source cell.

8. The method of claim 1 wherein the target cell calculates the TPC-UL based on the UL.

9. The method of claim 8 wherein the uplink transmit power control (TPC-UL) calculated by the target cell is based on signal-to-interference ratio (SIR) measured from the UL.

10. The method of claim 8 wherein the target cell and the source cell are associated with a same Node B and the TPC-UL command is forwarded by the target cell to the source cell.

11. The method of claim 8 wherein the target cell is associated with a first Node B and the source cell is associated with a second Node B such that the first Node B and the second Node B are different.

12. The method of claim 11 wherein the TPC-UL command is forwarded to a Radio Network Controller (RNC) using a first Power Control Indication message and then forwarded by the RNC through a Iub interface using a second Power Control Indication message to the source cell.

13. An apparatus for wireless communication, comprising:
    means for switching an uplink (UL) from a source cell to a target cell while maintaining a downlink (DL) with the source cell during a baton handover;
    means for transmitting a downlink transmit power control (TPC-DL) command to the target cell via the UL, the TPC-DL command subsequently being received at the source cell via a transmission from the target cell; and
    means for receiving an uplink transmit power control (TPC-UL) command from the source cell during the baton handover, wherein the TPC-UL command is generated by the target cell.

14. The apparatus of claim 13 wherein the TPC-UL command is used to control uplink transmit power of a user equipment.

15. The apparatus of claim 13 further comprising means for receiving the downlink (DL) from the source cell and calculating the TPC-DL.

16. The apparatus of claim 15 wherein the TPC-DL is based on signal-to-interference ratio (SIR) measured from the downlink (DL).

17. The apparatus of claim 13 wherein the target cell is associated with a first Node B and the source cell is associated with a second Node B such that the first Node B and the second Node B are different.

18. The apparatus of claim 17 wherein the TPC-DL command is forwarded to a Radio Network Controller (RNC) using a first Power Control Indication message.

19. The apparatus of claim 18 wherein the TPC-DL command is further forwarded from the Radio Network Controller (RNC) through an Iub interface using a second Power Control Indication message to the source cell.

20. The apparatus of claim 13 wherein the target cell calculates the TPC-UL based on the UL.

21. The apparatus of claim 20 wherein the uplink transmit power control (TPC-UL) calculated by the target cell is based on signal-to-interference ratio (SIR) measured from the UL.

22. The apparatus of claim 20 wherein the target cell and the source cell are associated with a same Node B and the TPC-UL command is forwarded by the target cell to the source cell.

23. The apparatus of claim 20 wherein the target cell is associated with a first Node B and the source cell is associated with a second Node B such that the first Node B and the second Node B are different.

24. The apparatus of claim 23 wherein the TPC-UL command is forwarded to a Radio Network Controller (RNC) using a first Power Control Indication message and then forwarded by the RNC through a Iub interface using a second Power Control Indication message to the source cell.

25. A computer program product, comprising:
a non-transitory computer-readable medium comprising code for:
switching an uplink (UL) from a source cell to a target cell while maintaining a downlink (DL) with the source cell during a baton handover;
transmitting a downlink transmit power control (TPC-DL) to the target cell in a TPC-DL command via the UL, the TPC-DL being subsequently received at the source cell via a transmission from the target cell; and
receiving an uplink transmit power control (TPC-UL) command from the source cell during the baton handover, wherein the TPC-UL command is generated by the target cell.

26. An apparatus for wireless communication, comprising:
at least one processor; and
a memory coupled to the at least one processor, wherein the at least one processor is configured to:
switch an uplink (UL) from a source cell to a target cell while maintaining a downlink (DL) with the source cell during a baton handover;
transmit a downlink transmit power control (TPC-DL) to the target cell in a TPC-DL command via the UL, the TPC-DL being subsequently received at the source cell via a transmission from the target cell; and
receive an uplink transmit power control (TPC-UL) command from the source cell during the baton handover, wherein the TPC-UL command is generated by the target cell.

27. The apparatus of claim 26 wherein the TPC-UL command is used to control uplink transmit power of a user equipment.

28. The apparatus of claim 26 wherein the at least one processor is further configured to receive the downlink (DL) from the source cell and calculating the TPC-DL.

29. The apparatus of claim 28 wherein the TPC-DL is based on signal-to-interference ratio (SIR) measured from the downlink (DL).

30. The apparatus of claim 26 wherein the target cell is associated with a first Node B and the source cell is associated with a second Node B such that the first Node B and the second Node B are different.

31. The apparatus of claim 30 wherein the TPC-DL command is forwarded to a Radio Network Controller (RNC) using a first Power Control Indication message.

32. The apparatus of claim 31 wherein the TPC-DL command is further forwarded from the Radio Network Controller (RNC) through an Iub interface using a second Power Control Indication message to the source cell.

33. The apparatus of claim 26 wherein the target cell calculates the TPC-UL based on the UL.

34. The apparatus of claim 33 wherein the uplink transmit power control (TPC-UL) calculated by the target cell is based on signal-to-interference ratio (SIR) measured from the uplink (UL).

35. The apparatus of claim 33 wherein the target cell and the source cell are associated with a same Node B and the TPC-UL command is forwarded by the target cell to the source cell.

36. The apparatus of claim 33 wherein the target cell is associated with a first Node B and the source cell is associated with a second Node B such that the first Node B and the second Node B are different.

37. The apparatus of claim 36 wherein the TPC-UL command is forwarded to a Radio Network Controller (RNC) using a first Power Control Indication message and then forwarded by the RNC through a Iub interface using a second Power Control Indication message to the source cell.

38. A method of wireless communication, comprising:
receiving, at a source cell having a downlink (DL) established with user equipment (UE), an uplink transmit power control (TPC-UL) command generated at a target cell during a baton handover;
receiving, at the source cell, a downlink transmit power control (TPC-DL) command via a transmission from a target cell, the TPC-DL command being received from the UE at the target cell having an uplink (UL) established with the UE; and
transmitting, from the source cell to the UE, the TPC-UL command to during the baton handover.

39. The method of claim 38, further comprising
adjusting a downlink transmit power for downlink transmissions to the currently served UE based at least in part on the TPC-DL command.

40. A source cell having a downlink (DL) established with a user equipment (UE) for wireless communication, comprising:
at least one processor; and
a memory coupled to the at least one processor, the at least one processor configured:
to receive an uplink transmit power control (TPC-UL) command generated at a target cell during a baton handover;
to receive a downlink transmit power control (TPC-DL) command via a transmission from a target cell, the TPC-DL command being received from the UE at the target cell having an uplink (UL) established with the UE; and to transmit the TPC-UL command to the UE during the baton handover.

41. The source cell of claim 40, in which the at least one processor is further configured to adjust a downlink transmit power for downlink transmissions to the currently served UE based at least in part on the TPC-DL command.

42. A computer program product for wireless communications, the computer program product comprising:
a non-transitory computer-readable medium having program code recorded thereon, the program code comprising:
program code to receive, at a source cell having a downlink (DL) established with a user equipment (UE), an uplink transmit power control (TPC-UL) command generated at a target cell during a baton handover;
program code to receive, at the source cell, a downlink transmit power control (TPC-DL) command via a transmission from a target cell, the TPC-DL command being received from the UE at the target cell having an uplink (UL) established with the UE; and
program code to transmit, from the source cell to the UE, the TPC-UL command to during the baton handover.

43. An apparatus for wireless communication, comprising:
means for receiving, at a source cell having a downlink (DL) established with a user equipment (UE), an uplink transmit power control (TPC-UL) command generated at a target cell during a baton handover;
means for receiving, at the source cell, a downlink transmit power control (TPC-DL) command via a transmission from a target cell, the TPC-DL command being received from the UE at the target cell having an uplink (UL) established with the UE; and
means for transmitting, from the source cell to the UE, the TPC-UL command to a during the baton handover.

44. A method of wireless communication, comprising:
generating an uplink transmit power control (TPC-UL) command at a target cell currently serving a user equipment (UE) for uplink transmissions while the UE maintains a downlink (DL) with a source cell during a baton handover;
transmitting, from the target cell, the TPC-UL command to the source cell currently serving the UE for downlink transmissions during the baton handover; and
transmitting, from the target cell, a downlink transmit power control (TPC-DL) command received from the user equipment (UE), the source cell subsequently receiving the TPC-DL command based at least on part on the TPC-DL transmission.

45. An apparatus for wireless communication, comprising:
at least one processor; and
a memory coupled to the at least one processor, wherein the at least one processor is configured:
to generate an uplink transmit power control (TPC-UL) command at a target cell currently serving a user equipment (UE) for uplink transmissions while the UE maintains a downlink (DL) with a source cell during a baton handover;
to transmit, from the target cell, the TPC-UL command to the source cell currently serving the UE for downlink transmissions during the baton handover; and
to transmit, from the target cell, a downlink transmit power control (TPC-DL) command received from the user equipment (UE), the source cell subsequently receiving the TPC-DL command based at least on part on the TPC-DL transmission.

* * * * *